US007197760B1

(12) United States Patent
Graef

(10) Patent No.: US 7,197,760 B1
(45) Date of Patent: Mar. 27, 2007

(54) APPARATUS FOR SELECTING SATELLITE TV CHANNELS USING A CHANNEL SELECTION UNIT FOR VHF AND UHF CHANNELS

(75) Inventor: Guido Graef, Fuerth (DE)

(73) Assignee: Grundig Multimedia B.V., Amsterdam (NL)

( * ) Notice: Subject to any disclaimer, the term of this patent is extended or adjusted under 35 U.S.C. 154(b) by 0 days.

(21) Appl. No.: 09/762,753

(22) PCT Filed: Dec. 8, 1999

(86) PCT No.: PCT/EP99/09636

§ 371 (c)(1),
(2), (4) Date: Mar. 22, 2001

(87) PCT Pub. No.: WO00/36840

PCT Pub. Date: Jun. 22, 2000

(30) Foreign Application Priority Data

Dec. 11, 1998 (DE) .............................. 198 57 241

(51) Int. Cl.
*H04N 5/50* (2006.01)
*H04N 7/20* (2006.01)
(52) U.S. Cl. ..................... 725/68; 725/48; 725/49; 725/78; 348/732
(58) Field of Classification Search ............... 725/68, 725/71, 72, 48–49, 78; 348/732
See application file for complete search history.

(56) References Cited

U.S. PATENT DOCUMENTS 2,898,400 A * 8/1959 Parmet et al. ........... 455/162.1
3,737,565 A * 6/1973 Ma et al. ..................... 348/732
3,825,838 A * 7/1974 Mayle ....................... 455/162.1
4,885,803 A * 12/1989 Hermann et al. ........... 398/112
5,073,930 A * 12/1991 Green et al. ................... 725/69
5,257,106 A * 10/1993 Maruoka ..................... 348/731
5,420,642 A * 5/1995 Baek .......................... 348/565
5,436,675 A * 7/1995 Hayashi et al. ............... 725/72
5,787,335 A * 7/1998 Novak .......................... 725/69
5,835,128 A * 11/1998 Macdonald et al. .......... 725/81
5,905,941 A * 5/1999 Chanteau .................... 725/127
6,104,908 A * 8/2000 Schaffner et al. ............. 725/78
6,134,419 A * 10/2000 Williams ..................... 725/151

FOREIGN PATENT DOCUMENTS

EP   0288928   * 10/1988

* cited by examiner

Primary Examiner—Chris Kelley
Assistant Examiner—Reuben M. Brown
(74) Attorney, Agent, or Firm—Quarles & Brady LLP

(57) ABSTRACT

The invention relates to a receiving station for satellite television signals. The inventive system comprises an external unit, satellite receivers and television units for receiving both satellite signals and VHF/UHF signals under control of a common channel selection unit and a control module assigned to each television receiver. The control module is provided for generating control signals for the satellite receiver, so that satellite image signals can be received when selecting certain channels that would otherwise be available for VHF and UHF reception.

14 Claims, 2 Drawing Sheets

APPARATUS FOR SELECTING SATELLITE TV CHANNELS USING A CHANNEL SELECTION UNIT FOR VHF AND UHF CHANNELS

TECHNICAL FIELD

The invention concerns a satellite television signal receiving unit.

DESCRIPTION OF THE BACKGROUND ART

Satellite television signal receiving units are already known from the book 12-GHz Satellite Reception by Bernhard Liesenkottër, 5$^{th}$ edition, 1994, published by Huthig Buch Verlag, Heidelberg. A community receiving station is described in Section 4.5.2 of this book on pages 104–106 which operates with a central modulation conversion. The television signals taken from the external unit of the satellite receiver station centrally in the receiving site, which can be provided, for example, on the roof of an apartment or multifamily home, are initially demodulated and then converted by remodulation to standard TV channels, i.e., to VHF or UHF signals. These can then be fed to a television set via a home antenna cable and played back on its screen.

A television set with one or more receivers or subscribers is known from EP 0 582 023 A1. The television set and the receivers or subscribers are connected to a cable, antenna and/or a cable network and/or a satellite receiver unit. This unit prepares satellite television programs and converts them to cable. The satellite receiving unit can be remotely controlled via the cable for the receiver or subscriber.

An antenna unit to receive signals of a terrestrial and an orbital transmitter with a satellite tuner arranged in the proximity of the antenna is known from DE 38 31 994 A1. A transcoder to convert the satellite signal to a standard signal and to supply it to the antenna take-off is also disclosed. Tuning of the satellite tuner, the method of operation of the transcoder and tuning of the modulator can be remotely controlled.

An arrangement for direct reception of satellite programs is disclosed in EP 0 288 928 A2. This arrangement has an external receiving station, to which a parapole antenna and a converter are connected. An internal unit is also provided, which accomplishes the functions of amplifier and signal converter. In order to make satellite signals receivable for a normal television set, the amplifier and converter are provided. The apparatus has a number of converters, which convert the converted signal to frequency bands in the UHF or VHF band.

The underlying task of the invention is to show a way how satellite television signals can be played back by means of a television set, for example, television receiver or video recorder in user-friendly fashion.

SUMMARY OF THE INVENTION

The general object is solved by the satellite television signal receiving station.

The advantages of a satellite television signal receiving station according to the invention consists especially of the fact that the user can choose by means of the same remote control both terrestrially received and satellite-transmitted television transmission without having to know from which of these sources the corresponding signals originate and without having to operate switching keys.

The advantages of a satellite television signal receiving station with the features stated in Claim 4 consist of the fact that it can be accomplished with ordinary television sets. The only requirement is that they have a Euro-AV socket. This is the case in most equipment available on the market.

By means of the feature stated in Claim 12 or 13, a reduction in the number of components of the satellite television signal receiving station is achieved.

With the memories mentioned in Claim 14, a situation is achieved in which the signals generated by the satellite receivers are almost free of delay so that no waiting times occur on switching to a new television program.

Additional advantageous attributes of the invention are apparent from the explanation of a practical example with reference to the figures.

DETAILED DESCRIPTION OF THE PREFERRED EMBODIMENTS

Figure 1:
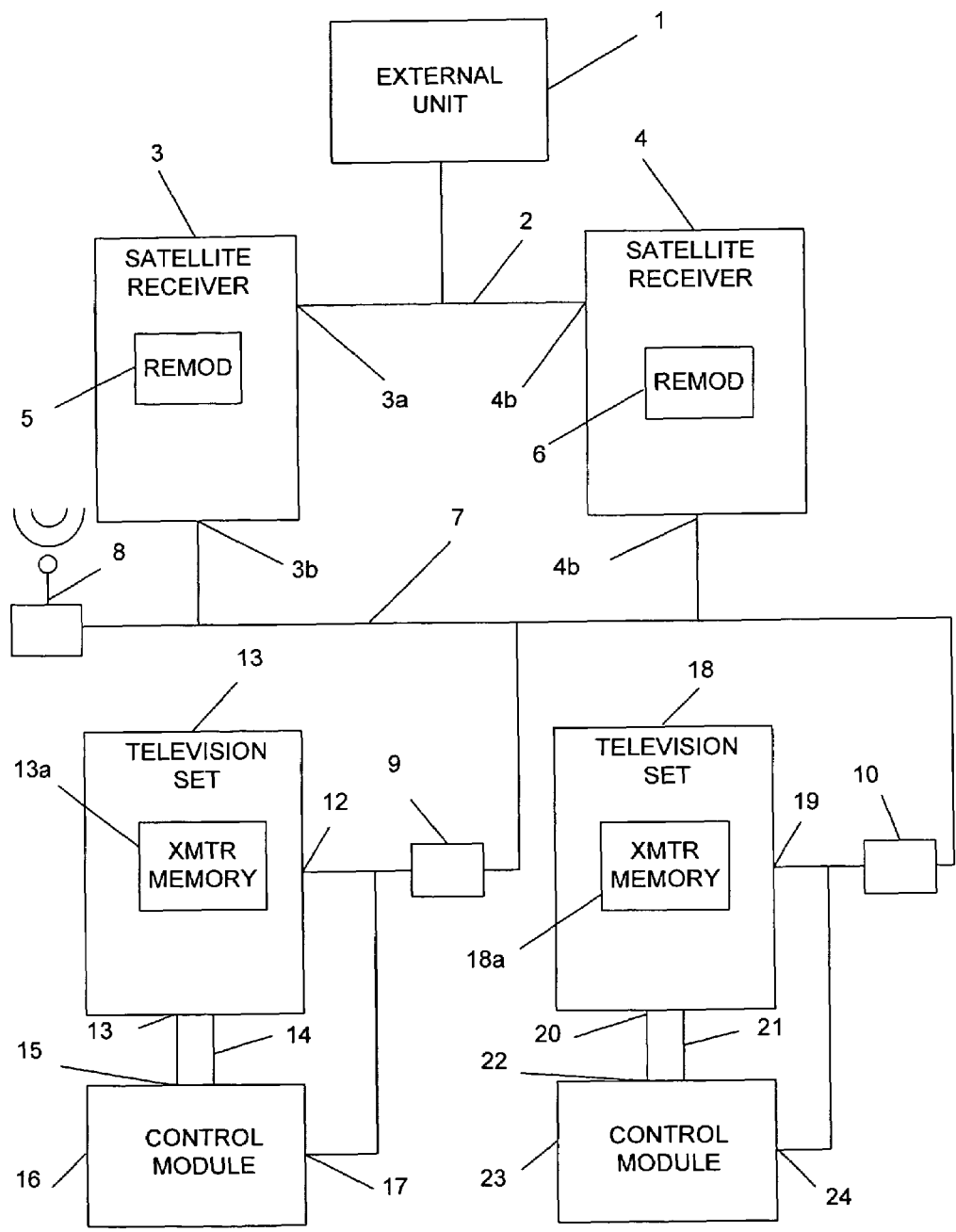
FIG. 1 shows a first practical example for the invention.

In FIG. 1, which shows a first practical example for the invention, a block diagram of the satellite television signal receiving station is depicted. It has an external unit 1, a satellite antenna cable 2, a first satellite receiver 3, a second satellite receiver 4, a house antenna cable 7, a house antenna 8, antenna sockets 9 and 10, a first television set 11, a first satellite receiver control module 16, a second television set 18 and a second satellite receiver control module 23, in which the house antenna cable 7 is provided for connection of the mentioned modules.

The first satellite receiver 3 has an input connection 3a, via which received and processed television signals are fed to it from the external unit 1. These are demodulated in satellite receiver 3 and remodulated by a remodulator 5 so that they come to lie in a standard TV channel that lies in the UHF or VHF range. The remodulated signals are made available at the output 3b of satellite receiver 3.

The second satellite receiver 4 has an input connection 4a, via which received and processed television signals are fed to it from the external unit 1. These are demodulated in the satellite receiver and remodulated by means of a remodulator 6 so that they come to lie in a normal TV channel that lies in the UHF or VHF range. The remodulated signals are made available at the output 4b of the satellite receiver 4.

The mentioned modules 3, 4, 5 and 6 are components of a central satellite head station, which is arranged on the roof of a block of apartments in a separate location from the mentioned television sets 11 and 18.

The two satellite receivers 3 and 4 are connected to the antenna sockets 9 and 10 via the house antenna cable 7. From the antenna socket 9 the house antenna cable 7 is conveyed to the first television set 11 and the first satellite receiver control module 16. From the antenna socket 10, the house antenna cable is conveyed to the second television set 18 and the second satellite receiver control module 23.

The first television set 11 is a microprocesser-controlled television set, which is connected to the house antenna cable 7 via an antenna connection 12. The first television set 11 also has a video signal output socket 13, especially a Euro-AV socket. This is connected via a cable 14, especially a Euro-AV cable, to a video signal input socket 15, especially a Euro-AV socket of the first satellite receiver control module 16.

In the subsequent description of the invention, the video signal input socket 15 and the video signal output socket 13 are Euro-AV sockets.

The second television set 18, which is set up in another room or residence of the apartment block, is also a microprocessor-controlled television set connected to the house antenna cable 7 via an antenna connection 19. The second television set 18 also has a Euro-AV socket 20 and is connected to Euro-AV socket 22 of the second satellite receiver control module 23 via Euro-AV cable 21.

The two television sets 11 and 18 are ordinary television sets as now available on the market. Each has a permanent transmitter memory 13a and 18a in whose memory positions data are stored by the user at the receiver location, which correspond to the tuning frequencies or corresponding division ratios for a number of desired transmitters, in which these desired transmitters are ARD, ZDF, BR3, SAT1, RTL, etc. These memory locations are assigned station key numbers so that the user can select a desired transmitter by activating a corresponding numerical key or numerical key combination of the remote control of the television set and switch the television set to a desired television channel.

The corresponding satellite receiver 3 or 4 also has a microcomputer provided for equipment control, among other things, to start a transmitter search run in the satellite receiver in reaction to a supplied control signal and to stop it again.

Since the two receiver groups 3, 11, 16 and 4, 18, 23 are arranged parallel to each other in terms of function, the method of function of the receiving station is only explained subsequently relative to receiver group 3, 11, 16.

It is assumed as starting situation that the television receiver 11 already has a programmed transmitter memory 13a in whose memory locations frequency data, channel data or corresponding division ratios are stored that correspond to the desired transmitters. These desired transmitters can then be called up by activating a numerical key or numerical key combination of the remote control.

If the television program selected by means of a numerical key is a satellite program that is received by means of the external unit 1 of the satellite television receiving station, then this reception occurs as follows:

After said activation of a numerical key of the remote control, the tuner of the television is tuned to the corresponding channel under the control of the microcomputer of the television receiver 11, in which the data required for this tuning are obtained from the transmitter memory 13a.

Since immediately after tuning of the tuner to the mentioned channel, no image signals are present from this channel, no image signals are present at the Euro-AV socket 13 of television set 11 either.

In the satellite receiver control module 16, to which the signal present at the Euro-AV socket 13 of the television set 11 is fed via the Euro-AV cable 14 and the Euro-AV socket 15, an image signal detector is provided, which recognizes whether image signals are present or not at the Euro-AV socket of the television set. For this purpose evaluation of the image content signals or synchronization signals can occur. However, an evaluation of a digital code from the image signal can also occur.

If the detector recognizes that no image signals are present, a control signal is generated in the satellite receiver control module 16, which is fed to the satellite receiver 3 via the connection 17 of the satellite receiver control module and the house antenna cable 7. This initiates a search process in satellite receiver 3, in the scope of which the satellite receiver searches in succession satellite channels for receivable transmitters.

If in this search a receivable transmitter is found in a satellite channel, the corresponding signals are demodulated in the satellite receiver 3 and then converted in remodulator 5 to a standard TV signal, which lies in the VHF or UHF range.

The channel of the VHF or UHF range into which the demodulated signal is converted is stipulated by the transmitter memory of satellite receiver 3. Information concerning a terrestrial television channel is stored in the memory locations of this transmitter memory corresponding to satellite channel information, for example, frequency information, channel data or corresponding division ratio. This information concerning a terrestrial television channel agrees in terms of its memory location and content with the corresponding information of the transmitter memory of television set 11.

This information is used by the modulator of the satellite receiver for remodulation of the television signal so that the television signal received in a satellite channel is converted in the satellite receiver to a specific corresponding terrestrial television channel that lies in the VHF or UHF range. This signal is then fed via the house antenna cable 7, antenna socket 9 and connection 12 to the tuner of the television set 11. Since this is tuned by the aforementioned operation of the corresponding number keys at this terrestrial receiving channel, image signals are present at the tuner output and also at the Euro-AV socket 13 of television set 11. This is recognized by the detector of the satellite receiver control module 16. As a result, an additional control signal is generated in the satellite receiver control module and fed to the satellite receiver 3 via connection socket 17 and house antenna cable 7.

This additional control signal causes a search stop in the satellite receiver 3, since the desired signals are now being received by the satellite receiver.

If, on the other hand, another television signal is found during the search in the satellite receiver, which is converted by remodulation to a (different) terrestrially receiving channel to which the tuner of the television set 11 is not tuned, then no image signal is present at the Euro-AV socket 13 of the television set and the search is continued in the satellite receiver 3.

If switching of the television set 11 to another channel occurs after screen playback of a television signal taken from satellite receiver 3, then image signals again are no longer present at the Euro-AV socket 13. The satellite receiver control module 16 then again generates a search start signal for satellite receiver 3. A search for receivable signals occurs after receiving the search start signal. The received signals are demodulated in the satellite receiver and then remodulated to a corresponding terrestrial television channel. This occurs until image signals are again present at the output of the tuner in television set 11. This is again recognized by the detector in the satellite receiver control module 16 so that the satellite receiver control module 16 sends a search stop signal to the satellite receiver 3 via house antenna cable 7.

In this procedure, after selecting a television transmitter by means of the keyboard of the television set 11, waiting times can occur, since only the desired transmitter must be determined during the search in satellite receiver 3. These waiting times can be shortened by the fact that by means of the depicted installation only a limited number of satellite transmitters are to be received. This can be achieved, for example, by the fact that only German language ASTRA transmitters are received. Because of this restriction, a situation is simultaneously achieved in which the number of available terrestrial channels into which the signals are converted during remodulation in the satellite receiver is not surpassed.

The mentioned waiting times can also be reduced by the fact that an intelligent search occurs in the satellite receiver. In this case, one makes use of the fact that the program or channel tables in the satellite receiver and in the television set are adjusted to each other. If this is the case, after a program switch of the television set by means of an operating keyboard in the satellite receiver, those satellite channels that correspond to VHF or UHF channels can initially be adjusted, which can be set during program selection by activation of a "+" or a "−" key of the keyboard. Only if this search is in vain, does a search occur in the entire reception range.

During this intelligent search, one can also make use of the fact that statistics are stored in the satellite receiver from which it follows which programs are viewed most often. These are then set first during the search after program selection. Only if this search is in vain, does a search occur over the entire reception range.

A significant advantage of the practical example depicted in FIG. 1 consists of the fact that ordinary television sets can be used in the described manner to receive several satellite television signals. The only requirement is that these television sets be provided with a Euro-AV socket, via which information is fed to the satellite receiver control module connected to the television set whether a received image signal is present or not after engagement or switching of the television set to a desired program.

The choice of a television program occurs, regardless of whether a television signal taken from the terrestrial receiving antenna 8 or the external unit 1 is involved, always by means of the operating unit of the television receiver. The user therefore needs no knowledge concerning which of these antennas the signal is coming from and also does not have to switch from the terrestrial plane to the satellite plane.

Advantageously, at an appropriate position of the depicted receiver, a switch can be provided that automatically interrupts the signal path from the antenna to the television set that is not required at the moment by means of selection of a television transmitter carried out with the operating unit.

In order for the satellite receiver control module not to be disturbed by internal on-screen display generators of the television set during detection of the television signal, a digital code signal can be introduced advantageously into the UHF or VHF signal generated in the satellite receiver, for example, in the blanking intervals of the signal. Only when the presence of this code signal is detected in addition to an image signal in the satellite receiver control module is a search stop signal generated for the satellite receiver.

Preferably the television set 11 and the satellite receiver control module connected to it are coupled in terms of power supply so that during operation of the power switch both devices are switched on and off together.

It is possible in the practical example just described to receive the signals of a specific transmitter, for example, ARD, both via the terrestrial antenna 8 and via the external unit 1, which has a satellite antenna. A different or also the same station key number can then be assigned to the terrestrial reception of this transmitter as for satellite reception. If the same station key number is assigned to terrestrial reception as to satellite reception, then the desired reception can be ensured either using automatic priority determination, according to which preference is to be given to satellite reception, or by manual priority determination.

A receiving station according to the invention preferably includes several satellite receivers, several television sets and several satellite receiver control modules. In order to ensure clear coordination between the corresponding satellite receivers and the corresponding satellite receiver control modules, a module code signal is introduced into the signals transmitted by the satellite receiver control module to the satellite receiver, for example, a digitally coded sequential number.

Figure 2:
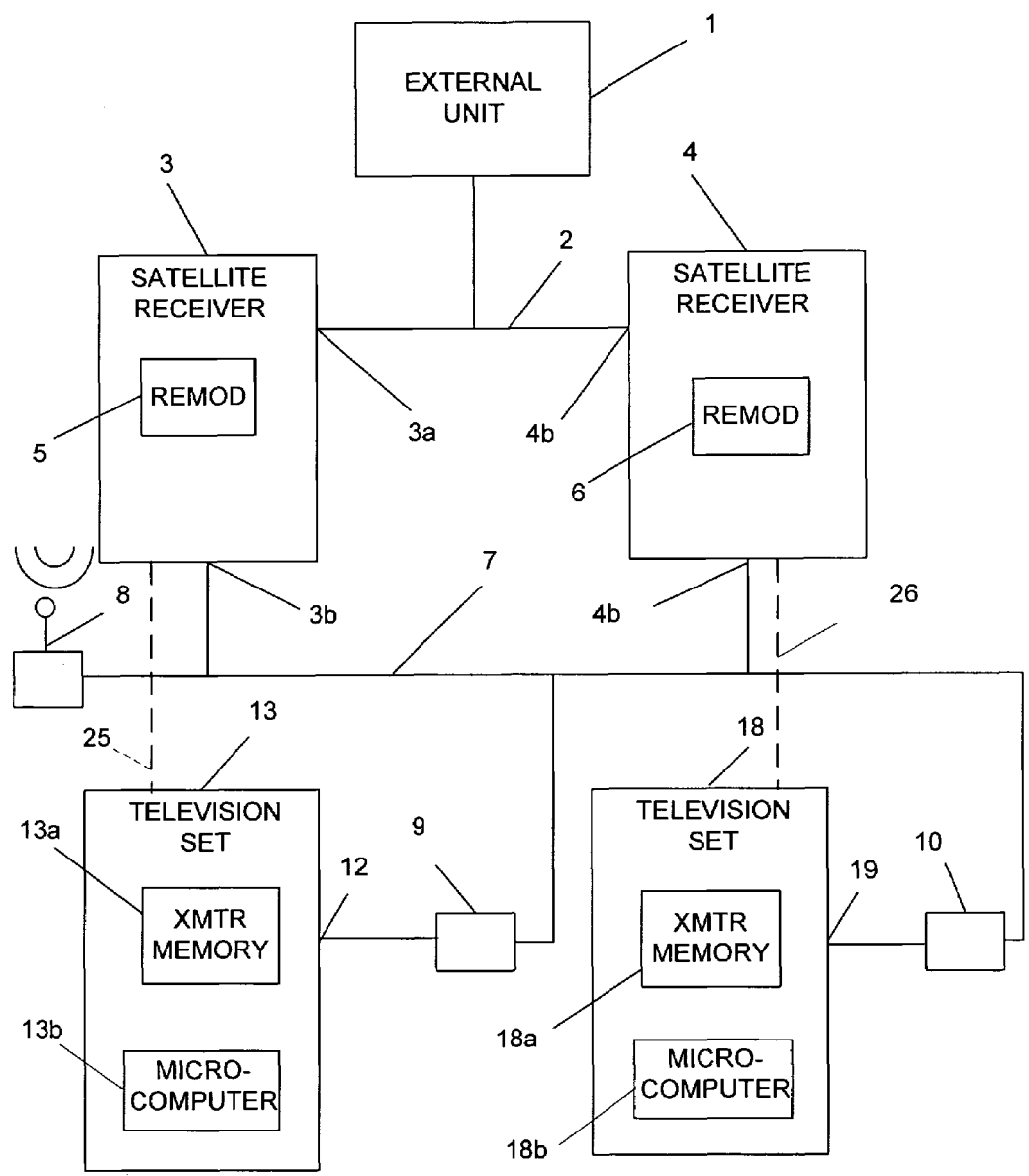
FIG. 2 shows a second practical example for the invention.

FIG. 2 concerns a second practical example for the invention and shows a block diagram of another satellite television signal receiving station.

The satellite television signal receiving station depicted in this FIG. 2 largely agrees with that depicted in FIG. 1. Only the differences between the two receiving stations are taken up subsequently.

In the station depicted in FIG. 2, the satellite receiver control module is integrated in the television set 11, 18. The function of the satellite receiver control module is monitored in the mentioned television sets by the corresponding microcomputers 13b, 18b.

Since the mentioned microcomputers 13b, 18b have access after program selection by the keyboard to the frequency, channel or division ratio data corresponding to the selected program, which are stored in the transmitter memories 13a, 18a, in this practical example for the invention, the mentioned frequency, channel or division ratio data can be fed to the satellite receiver 3, 4. This can occur either via the house antenna cable 7, via the ac power mains present in the house or via another signal connection 25, 26 expressly prescribed for this purpose.

The satellite receiver 3, 4 with this information using its own transmitter memory can immediately draw conclusions concerning the corresponding satellite channel and make the desired satellite signal available free of delay. In this practical example, no search in the satellite receiver is required after program engagement or switching nor is any transmission of a search start and search stop signal necessary via house antenna cable 7.

The connections 12 and 19 can also be Euro-AV sockets, via which the corresponding satellite receiver control module communicates with the corresponding satellite receiver.

The invention claimed is:

1. Satellite television signal receiving station comprising:
   a satellite receiver which has an input connection connectable to an external unit of the receiving station to receive satellite television signals derived from the external unit, an individual modulator, which is provided to convert the satellite television signals from any one of the receivable satellite television channels into image signals for reception by a television set on a VHF or UHF channel, and a house antenna connection, at which VHF or UHF signals can be tapped,
   a television set located separate from the satellite receiver, the television set having at least one video signal output socket,
   a house antenna cable, to which the satellite receiver and television set are connected, each of which has a house antenna connection,
   a satellite receiver control module connected to the television set or integrated in the television set is provided, which receives video image signals from the television set and in response thereto generates control signals to the satellite receiver, wherein the control signals generated in the satellite receiver control module include a search start signal to the satellite receiver for initiating a search for image signals on a satellite channel in the satellite receiver, and a search stop signal for stopping the search in response to the satellite receiver control module detecting video image signals on a selected channel;

wherein the satellite receiver control module has a detector that detects engagement or switching of the television set to a UHF or VHF channel and generates the search start signal when engagement or switching is detected; and wherein a user can select both conventional VHF/UHF channels and satellite reception channels with one channel selection unit on the TV home receiver, or through one remote control, which include only channels of the VHF/UHF range.

2. Satellite television signal receiving station according to claim 1, wherein the video signal output socket is a Euro-AV socket.

3. Satellite television signal receiving station according to claim 1, wherein the control signals generated from the satellite receiver control module for the satellite receiver are transmitted via the house antenna cable, ac power mains or a signal connection provided between the television set and the satellite receiver to the satellite receiver and that the satellite receiver is arranged to receive control signals generated by the satellite receiver control module.

4. Satellite television signal receiving station according to claim 3, wherein the control signals are transmitted in the form of a 22 KHz switching signal.

5. Satellite television signal receiving station according to claim 1, wherein the satellite receiver control module is arranged outside of the television housing and that image signals are fed to the satellite receiver control module via a Euro-AV socket of the television set, the image signals corresponding to the image signals displayed on the screen of the television set.

6. Satellite television signal receiving station according to claim 1, wherein the satellite receiver has a means to introduce a code signal into the television signals.

7. Satellite television signal receiving station according to claim 6, wherein the satellite receiver control module has a detector that detects the presence of the code signal in the television signals present at a Euro-AV socket and generates a search stop signal only when the code signal is detected.

8. Satellite television signal receiving station according to claim 1, wherein the satellite receiver control module is arranged within a television receiver housing.

9. Satellite television signal receiving station according to claim 8, wherein the satellite receiver control module is the microcomputer of the television receiver.

10. Satellite television signal receiving station according to claim 1 wherein the satellite receiver has a permanent memory, by which terrestrial receiving channels lying in the VHF or UHF range are assigned to each received satellite television program and that the television set has a transmitter memory that is provided to store frequency data, channel data or division ratios corresponding to the terrestrial receiving channels.

11. Satellite television signal receiving station according to claim 1, wherein it has several satellite receivers, several television sets and several satellite receiver control modules.

12. Satellite television signal receiving station according to claim 11, wherein the control signals generated by the satellite receiver control modules are provided with a code signal for the satellite receiver control modules generating a corresponding control signal.

13. Satellite television signal receiving station according to claim 1, wherein the television set and the satellite receiver have a common channel selection unit.

14. Satellite television signal receiving station according to claim 13, wherein the channel selection unit for terrestrial television signal reception and satellite television signal reception occurs through a numerical keyboard of the common channel selection unit without requiring a switching process between terrestrial reception and satellite reception.

* * * * *